United States Patent
Margulis et al.

(10) Patent No.: US 7,421,702 B1
(45) Date of Patent: Sep. 2, 2008

(54) USER-DRIVEN, SERVICE ORIENTED SOFTWARE APPLICATION MODEL

(75) Inventors: Efim Margulis, Ashdod (IL); Moshe Ilan Rozenblat, Lexington, MA (US)

(73) Assignee: Cerylion, Inc., Burlington, MA (US)

( * ) Notice: Subject to any disclaimer, the term of this patent is extended or adjusted under 35 U.S.C. 154(b) by 530 days.

(21) Appl. No.: 11/054,378

(22) Filed: Feb. 9, 2005

(51) Int. Cl.
*G06F 13/00* (2006.01)

(52) U.S. Cl. ...................... 719/316; 719/313

(58) Field of Classification Search ............... 719/330, 719/331, 332, 313, 316
See application file for complete search history.

(56) References Cited

U.S. PATENT DOCUMENTS

| | | | | |
|---|---|---|---|---|
| 5,983,021 | A * | 11/1999 | Mitrovic | 717/158 |
| 6,675,227 | B1 * | 1/2004 | Gavrilo et al. | 719/316 |
| 6,757,720 | B1 * | 6/2004 | Weschler, Jr. | 709/220 |
| 7,246,358 | B2 * | 7/2007 | Chinnici et al. | 719/315 |
| 7,266,821 | B2 * | 9/2007 | Polizzi et al. | 718/100 |
| 2006/0150172 | A1 * | 7/2006 | Heath et al. | 717/162 |

* cited by examiner

Primary Examiner—Andy Ho
(74) Attorney, Agent, or Firm—David A. Dagg

(57) ABSTRACT

A user-driven, service-oriented application model, in which conformant applications implement and process instances of two program object types. Components in conformant applications consist of objects having built-in behaviors that are common across different applications. Each application object is either an instance of a predefined active object type, or an instance of a predefined reactive object type. Active objects are associated with individual users of their application, are allowed to activate services, and encapsulate all their inputs and outputs within a bounded space. Reactive objects are instantiated or processed by services, and, in one embodiment, each one is owned by an individual active object at any given point in time. During operation of the disclosed system, services activated by active objects route reactive objects to active objects. An active object assumes ownership of a received reactive object upon receipt. All components may be designed to operate in a pre-defined run-time execution space. Additionally, all applications may interact with their associated users using a pre-defined service invocation model.

23 Claims, 7 Drawing Sheets

USER-DRIVEN, SERVICE ORIENTED SOFTWARE APPLICATION MODEL

FIELD OF THE INVENTION

The present invention relates generally to computer software architectures, and more specifically to a method and system for effectively providing a user-driven, service oriented software application.

BACKGROUND OF THE INVENTION

As it is generally known, software application programs (also referred to as "application programs" or "applications") are often extremely complex. Additionally, the variance in scope, functionality, depth, and breath between even relatively similar application programs is much higher than that typically found between examples of other kinds of products. As a result, it is difficult to optimize production capacity in software application development, since every software application developer must substantially "re-invent the wheel" for each application developed.

It would be highly desirable, from a productivity and quality assurance perspective, to have an application design, or "model" that is applicable and advantageous across multiple specific software application programs. If an appropriate common software model is not available across multiple applications, it is difficult to assure predictable, consistent, reproducible quality levels in the development process, since the application "production line" does not use the same built-in model in all resulting products. However, if a software model can be used across multiple application programs, a development process can more effectively and conveniently pre-test and pre-optimize certain system-level properties, since those properties fall out of the shared software model, and are common to all the developed applications.

A number of prior systems have attempted to provide a common model for software application programs. The IBM/MF environment is an early example of such efforts, and includes a form processing application model providing conformant applications with a built-in model. The IBM/MF approach is oriented towards record keeping, and authenticates users to determine which forms they are allowed to access. An authenticated user is permitted to fill in encoded input forms embodying the integrity and logic of the underlying system data structures. The user submits a form in its totality once he or she decides the form is ready for processing. The application then processes the completed form and either rejects it and sends it back for edits, or stores it in a database in which each form equals one stored database record.

Systems such as IBM/MF arose during what may be considered a software application "industrial era", in which all applications operated using a transaction engine built and optimized for processing forms. A specific example of such a system is one running VM/IMS or MVS/CICS/DB2, operating on an IBM/MF System 360. Using these systems, programmers do not have to "re-invent the wheel", or necessarily understand how the underlying system works, in order to do develop effective applications. While the scope of the applications' that can be developed for these environments is relatively limited, application developer productivity, and resulting application quality, are relatively high.

More recently, in what may be referred to as the "client-server era", no similarly applicable, common application model has arisen. Instead, many variants of "Remote Procedure Calls" (RPCs) are often used to allow applications to spread their execution across different computer systems. Advantageously, the wide range of applications that can be developed using a client-server approach covers a wide range of data processing needs. However, the fact that these client-server applications cover what is effectively an open-ended range of data processing needs gives rise to a number of difficulties. In particular, there has been no correlation between the user definitions in the database server and user definitions in the applications using the databases on the database server. Typically, the only predictable component in such systems has been a single centralized database server used to store the shared outcome of all transactions.

As a result of the increased complexities presented by the wide scope of applications that can be supported in a client-server environment, the applications themselves have been effectively unmanaged. Application developers generally have great freedom with regard to how they design client-server applications, and no built-in model has been used to bound 'client' program portions or 'server' program portions to specific roles and responsibilities. Programmers individually may decide where and when the 'client' program portion ends and the 'server' program portion begins. As a result, what is referred to as the "business logic" of each application is split at some indeterminate point between the client and server portions. Multiple, different points-of-failure result from the fact that there is no unified governing structure for these applications. Moreover, any underlying engine for these applications cannot predict the model used for any given application. As a result, mission-critical or industrial-strength systems are often still IBM/MF applications, despite associated costs and maintenance risks of using this technology.

While the HTTP (HyperText Transport Protocol) provides a clear page-based processing model for browsing distributed content, it is not a sufficient application model for contemporary applications. As it is generally known, when using HTTP, a user requests a specific HTML (HyperText Mark-Up Language) page, and an HTTP server responds by sending the requested page. An HTTP browser is a bounded client application in that it includes a built-in rendering engine, is capable of sending HTTP requests, and renders the response in a way that allows the receiving user to browse it. An HTTP server is some sense a bounded application, in that it is capable of processing an HTTP request, and returning an HTML page to the HTTP client. Additionally, user navigation actions are consistently encoded using a concise notation of URLs (Uniform Resource Locators).

Despite the advantages of using an HTTP system to provide distributed applications over the Web, developers for different applications based on HTTP do not have the advantages of a shared, built-in application model for their applications. HTTP simply doesn't go beyond effectively enabling requests to be routed over the Web to application servers, and thus virtualize access to programs executing on application servers. Related technologies such as EJB (Enterprise Java Beans), COM (Common Object Model), and NET (Microsoft®'s framework for Web services and component software), provide some features, such as an instruction-set and tools for constructing program components, but fundamentally provide only a syntactical envelope for wrapping interactions among components. These technologies do not provide binding semantic interfaces, nor do they establish any transactional structure for interconnection.

In sum, within the execution context of client-server applications, application servers provide a component model, but not an application model. Client-server application program developers have great freedom to decide how specific components within the applications, such as client and server components, operate. For example, developers of client-server applications may freely determine whether a given component accesses a database directly or not, or calls another component directly or not. Along these same lines, client-server application developers have to establish their own, application specific techniques for inter-component interactions, and handling of any resulting transactional side-effects. Moreover, client-server application developers must develop application specific means for managing a stable and reliable application state across components and across user sessions.

Another problem with existing systems relates to the basic need to effectively find specific components that provide services over the Web. In this regard, a "guideline" has arisen in which single components typically correspond to individual "business-level services". A more technological solution has also arisen that makes a component available as a "Web Service"—the component documents its interface for the service in an XML (eXtensible Markup Language) structure. In this way, Web Service infrastructure technologies provide a distribution system for registered components. This type of documented component distribution system helps facilitate the consumption of component services, but still does not provide a model for developing applications that produce such services or that base their operation on consuming such services.

Accordingly, as described above, there is still a need for a new application program model for today's applications. Even using the above described existing systems, software application components are still significantly 'context-free' in terms of critical user, session, and transaction information. Components can be provisioned generally, but the users of the components are not known or accounted for in the provisioning process, and accordingly the use of the provisioned components cannot be accurately provisioned. Transactions supported in existing systems are still based on the traditional approach of coordinating access to shared data. Meanwhile, the scope of and functionality provided by contemporary applications has become increasingly user-centric. For example, most transactions are individualized to a user, as in, for example, many e-Commerce type systems. Moreover, a substantially increasing number of transactions are executed based at least in part on a specific user's stored properties, as in, for example, CRM (Customer Relationship Management), or "Trouble Ticket" type Web-based customer service systems. Existing systems leave users and transactions outside the scope of their components model, and each application must establish its own specific execution model. Software application developers must still custom-build application architectures, while the scope and functionality of their application programs becomes ever more demanding. Additionally, the underlying system engine for most applications still cannot predict application behavior in a useful way, across different applications. As a result, the management and optimization of system-level properties is still a complex, high-maintenance exercise, that must be specifically performed on an individual application basis.

SUMMARY OF THE INVENTION

To address the above described and other shortcomings of the prior art, a user-driven, service-oriented software application model is disclosed. In the disclosed system, a service processing application model defines general-purpose invariants that bound the execution of all applications constructed using the disclosed model. In the disclosed system, conformant applications implement and process instances of two program object types. Each of the two object types has a pre-defined role in the disclosed application model, and complies with specific execution rules providing clear boundary conditions.

In the disclosed system, software components in conformant applications consist of program objects having built-in behaviors that are common across different applications. Each program object is either an instance of a predefined active object type, or an instance of a predefined reactive object type. For purposes of explanation, active objects are sometimes referred to as Player objects, and reactive objects are sometimes referred to as Infogram objects. Player objects are each associated with corresponding application users, are allowed to activate services, are persistent across transactions, user sessions, and/or application runs, and serve to encapsulate their inputs and outputs within a bounded space. Infogram objects are instantiated or processed by services, and, in one embodiment, a system invariant is that each Infogram object is always owned by a specific Player object at any given point in time. Infogram objects may also be persistently stored across multiple transactions, user sessions, and/or application runs, as needed. During operation of the disclosed system, services activated by Player objects route Infogram objects to Player objects. A Player object assumes ownership of a received Infogram upon receipt of that Infogram object.

In a preferred embodiment, each object operates in its own pre-defined run-time execution space having clear boundary conditions. The disclosed, pre-defined run-time execution space for an object is sometimes referred to herein, for purposes of explanation, as the Player Sandbox.

In a preferred embodiment, all applications interact with their associated users using a pre-defined service invocation model, referred to for purposes of explanation as the Service Invocation Chain. In such an embodiment, users do not directly execute a conformant application service. Instead, users issue service requests for specific applications, but that are received by an underlying system engine program that supports the disclosed application model. Upon receipt of a first service request, the underlying system engine authenticates the requesting user. If the requesting user is successfully authenticated, the system engine performs one of the following steps:

1) If this is the first request by the user, a Player object is instantiated for the requesting user; and 2) If this is a request by a user that already has a Player object instantiated, then the existing Player object is re-activated from its persistently stored image.

The system engine further creates a unique entry in its routing table for the Player object of the authenticated user. Additionally, a Player-specific private namespace (a Player Sandbox) is created for the Player object to use when executing the requested service. The Player object then executes the requested service and awaits the next service request. All subsequent service requests by the user for the Player object are routed to this Player Sandbox for execution. The disclosed system may further operate to detect when the user for the Player object logs out, or is idle for a predetermined period, at which point the underlying system engine may operate to disconnect the Player object from the application, for example by releasing volatile memory and other resources allocated to the object, thereby completing the end-to-end management of the whole life-cycle for Players and their Infograms. The disclosed system governs the execution of all general-purpose applications practicing this invention, regardless of their specific functionality, and operates all Players and Infograms using the consistent and predictable interaction scheme disclosed herein, regardless of their specific methods and properties. The lack of a built-in application model that governs the execution of general-purpose software applications is not unlike the state of affairs in the automotive industry prior to the invention of production-line architectural technologies that could govern the production of a wide portfolio of automobile types across different models, trims and options. Similar novel inventions of architectural technologies establishing production lines of complete products have been proven time and again to enable fundamental breakthroughs in industries producing complex finished goods. The disclosed system enables similar productivity and quality assurance benefits to general-purpose software applications practicing this invention.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
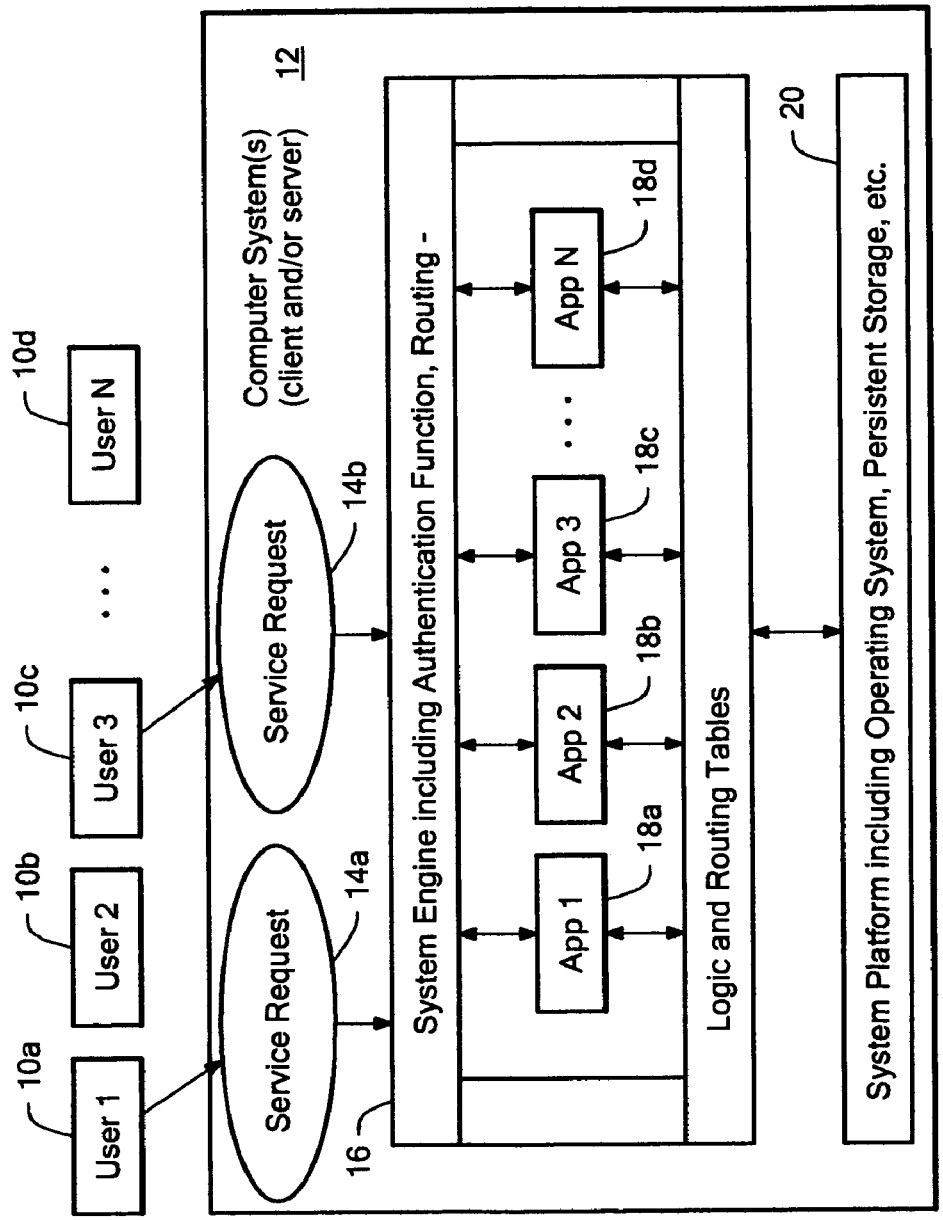
FIG. 1 shows an example of a system including a number of applications conformant with the disclosed application model executing in an illustrative execution environment.

As shown in FIG. 1, in illustrative embodiment of the disclosed system operates in an execution environment including a number of users, shown as User 1 10a, User 2 10b, User 3 10c through User N 10d, interfaced to one or more computer systems 12, which may include client computer and/or server computer systems. The users shown in FIG. 1 issue service requests, shown as service request 14a and service request 14b, that are received by the system engine 16.

The system engine 16 may consist of one or more software programs, and is communicably coupled to a number of software applications conformant with the disclosed application model, shown for purposes of illustration as App 1 18a, App 2 18b, App 3 18c through App N 18d. The system engine 16 includes an authentication function, routing logic, routing tables, and other functionalities. The system engine 16 is further communicably coupled to the system platform 20, which includes an operating system for controlling and interfacing to various resources in the computer system(s) 12, including persistent program storage. The persistent storage may be provided using any appropriate device, including one or more direct access storage devices, such as magnetic disks. The computer system(s) 12 may, for example, further include one or more processors coupled to volatile program storage memory, together with various other input/output (I/O) devices and/or communication interfaces.

Each of the users shown in FIG. 1 may, for example, consist of any uniquely identified entity that interacts with the conformant applications. Most often, a user will be a named individual, but other times a user may consist of an automated utility activating services on behalf of a specific user. During operation of the embodiment shown in FIG. 1, the users issue service requests 14a and 14b that initially arrive at the system engine 16. The system engine 16 then authenticates the service requests, and establishes object instances, allocates execution space and routing table information as needed to handle the received requests for each of the conformant application programs, and handles storage of objects in persistent storage, as further described below. The system engine 16 further operates to hide the details of the system platform 20 from the conformant applications. Each of the conformant software applications shown in FIG. 1 consist of program objects that are either active or reactive program objects, also as further described below.

While reference is made above to one or more computer systems 12, which may include client computer and/or server computer systems, those skilled in the art will recognize that the disclosed system may be embodied in an execution environment in which a load balancer is used to distribute service requests across service processing resources resident on multiple computer systems. Such load balancing may be accomplished in a variety of specific ways, for example using any specific configuration of a loosely coupled set of distributed servers, or a tightly coupled cluster of server systems. Moreover, such a load balancing configuration may be used to distribute service requests sent to a DNS (Domain Name Service) address associated with an Internet domain name. Thus the disclosed system may be embodied in an execution environment including a single logical server that is physically distributed across a set of independent machines.

Figure 2:
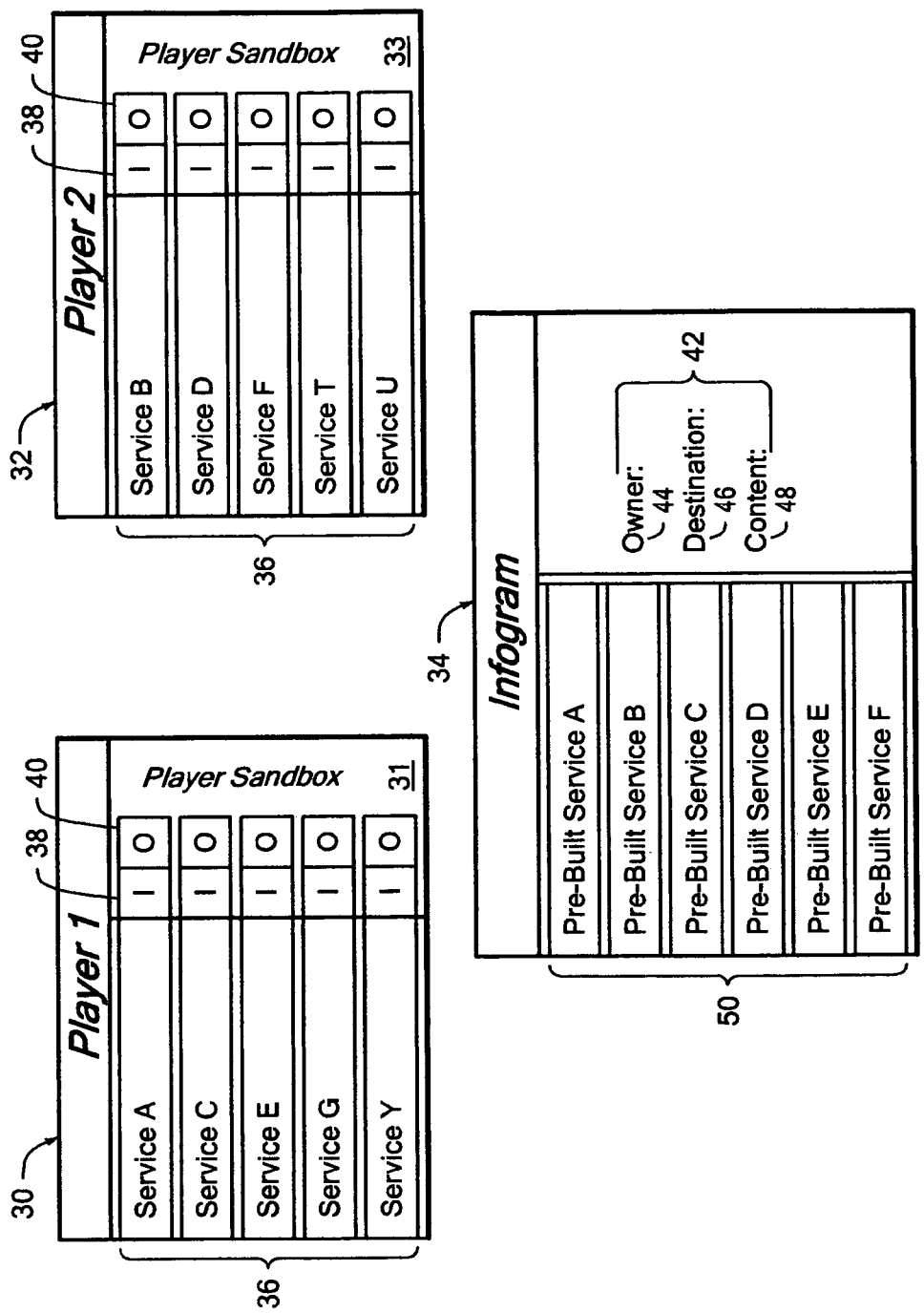
FIG. 2 shows an illustrative embodiment of the disclosed active and reactive program components.

FIG. 2 shows an illustrative embodiment of the disclosed active and reactive program objects of the disclosed application model. FIG. 2 shows examples of active program objects referred to as Player 1 30 and Player 2 32, as well as an example of a reactive program object referred to as Infogram 34. The program objects 30, 32 and 34 of FIG. 2 are examples of specific types of software program "objects", and may be generated using various types of object-oriented programming languages such as C++, Java, or C-Sharp, and specific run time environments such as Java Virtual Machine or Microsoft.Net Framework. For example, an object-oriented programming environment used to support the disclosed system may support the object-oriented techniques of encapsulation, inheritance and polymorphism. Encapsulation in this context refers to creation of program "objects" for containing data and associated methods or functions to manipulate the data, where the objects are based on predefined data types sometimes referred to as "classes." An instance of one of the disclosed, predefined classes may simply be referred to as an "object." As is conventional, inheritance in this context allows definitions in one class to be passed down to another class through a class hierarchy. Polymorphism also conventionally allows procedures for an object to be created, without the specific object type of the object being known until run time.

In the disclosed system, each of the active objects, shown for purposes of illustration as player 1 30 and player 2 32 in FIG. 2, is associated with a single, corresponding, uniquely identified user entity that interacts with the application containing the active object. As noted above, these users are usually named individuals, but may also be automated utilities activating services on behalf of a specific individual. Each active object is instantiated using a predefined data type that defines any meta-data the application associates with the active object, as well as a set of services provisioned for it. The active object is a named, persistent object encapsulating all of the associated user's interactions with the application. An active object is operable to encapsulate both its methods, which correspond to application services that may be requested and used by the object's associated user, and data relating to uses of those application services by the object's associated user.

The active objects 30 and 32 in FIG. 2 are each shown including a number of services 36. Each service of an active object embodies a single interaction of the user associated with the active object with the application, for example resulting in what the application sees as a single business transaction. In one embodiment, following what is referred to as the Service-Oriented-Architecture (SOA) design approach, each of the services 36 provides formal interfaces for its inputs shown in column 38 and its outputs shown in column 40.

Each active object in the disclosed system activates its services and manages its data. The data for each active object may, for example, include data provided as inputs and outputs for services by the associated user, data that is expected to be available across services, personal data identifying the associated user irrespective of specific service, and/or other data.

Advantageously, active objects in the disclosed system are persistent, in that they are stored in non-volatile storage of some type based on a predetermined periodic schedule and/or one or more trigger events. The storing of active objects in persistent storage may, for example, be performed by the system engine 16 shown in FIG. 1. In this way, the active objects of the disclosed system provide durable application state and context across multiple service invocations, user sessions and application runs.

Active objects are responsible for defining their own application data and registering their application services using any appropriate type of service registry so that they can be located and accessed. Application programs are responsible for registering their active objects and defining the access rights of the active objects, for example based on access authorizations of the users associated with those active objects. The underlying system engine supporting the applications, such as the system engine 16 of FIG. 1, is responsible for provisioning active objects and managing their persistent storage images. As a result of the disclosed system engine and application model, the disclosed active objects may be high-level, application programming constructs, rather than including system-level or platform specific programming, since the applications containing them do not have direct access to system platform methods and properties. Such system platform methods and properties are handled through the system engine 16 as shown in FIG. 1.

In the disclosed system, the application model requires that active objects can only change their own state. As active objects transact with each other, the disclosed application model defines another, different object type for maintaining the application's integrity while the data is in transit between active objects. The disclosed system manages data-in-transit among active objects using what are referred to herein as reactive objects, shown for purposes of illustration as the infogram program object 34 in FIG. 2. The disclosed reactive objects were necessitated by the fact that previous messaging technologies are insufficient, since their messages are context-free. Thus, using such previous messaging technologies, the application's overall integrity is conditioned upon both the sender and the receiver absolute coordination across time and space, and their completely aligned interpretation of the message in the very same way.

In order to avoid such problems, the reactive objects of the disclosed system are managed objects encapsulating data-in-transit among the active objects. Instead of sending messages between objects, the disclosed system routes reactive objects between active objects. The disclosed reactive objects are reactive in that they are each instantiated or processed by services of the active objects.

In one embodiment, a system invariant is that each reactive object is always owned by a specific active object at any given point in time. At any given time, a reactive object is only accessible to its owner. Other than the reactive object's owner, other active objects can only determine the reactive object's existence, and find its location or address.

A reactive object's owner is always defined by a persistent link to the active object that owns it. Initially, the owner of a reactive object is defined by a persistent link to the active object that instantiated it. For example, in the case of an order processing application, a reactive object representing the order is instantiated by the active object associated with the customer-user that placed the order.

A service of an active object can route a reactive object to one or more other active objects. In the example where a customer places an order through an order processing application, the reactive object instantiated to represent the order may be routed using a service of the active object corresponding to the customer placing the order, to another active object representing a merchant for the ordered goods.

Like active objects, reactive objects are persistent objects, in that they are copied into persistent storage by the system engine 16 of FIG. 1, based on some predetermined periodic schedule, or as a result of detecting one or more trigger conditions. Also like active objects, reactive objects encapsulate their methods and properties. Persistent properties 42 identify the current owner 44 of a reactive object, which is the sending active object prior to the receiving active object assuming ownership. The persistent properties 42 further identify a current destination active object 46, and the data exchanged using the reactive object, shown as content 48.

The reactive object 34 is shown including methods 50, including pre-built services that define desired "hand-off" events with respect to passing the reactive object 34 between active objects. A reactive object may include pre-built and possibly also dynamically defined services. The pre-built service of a reactive object relate to ownership handoff events and/or routing of the reactive object between active objects. These pre-built services are common to all reactive objects. Other predefined services may be provided for either active or reactive objects, such as shell functions allowing the objects to execute I/O functions through an underlying system engine. Since neither the active or reactive object can directly access platform specific I/O functions, shell functions can be used to associate high level I/O operations with specific system services. This advantageously helps to ensure application invariance across platforms and deployments.

During operation of the disclosed system, the system engine 16 of FIG. 1 is responsible for providing a reliable transaction that transfers one or more reactive objects between active objects. For example, such a transaction may include setting a persistent link in the destination 46 to the receiving active object, and changing the ownership of the reactive object to the destination active object at some predetermined point in the transaction. The transaction is accordingly made durable, in that non-repudiation is guaranteed. Each active object involved in a transaction, including a current owner 44 and the destination 46, can update its own state relative to the change in the state of the reactive object. No reactive object is ever an "orphan", or "transient", or in both places. As a result, the disclosed reactive objects are persistent application objects that are reliably managed across time and space.

Each of the active objects shown in FIG. 2 includes its own private execution space, or Player Sandbox. As shown in FIG. 2, the active object 30 includes a private execution space 31, and the active object 32 includes a private execution space 33. Each of the private execution spaces of the program objects in the disclosed system are unique over both space and time. The reactive object 34 is being executed within Player Sandbox of the respective active object that activates its services.

Figure 3:
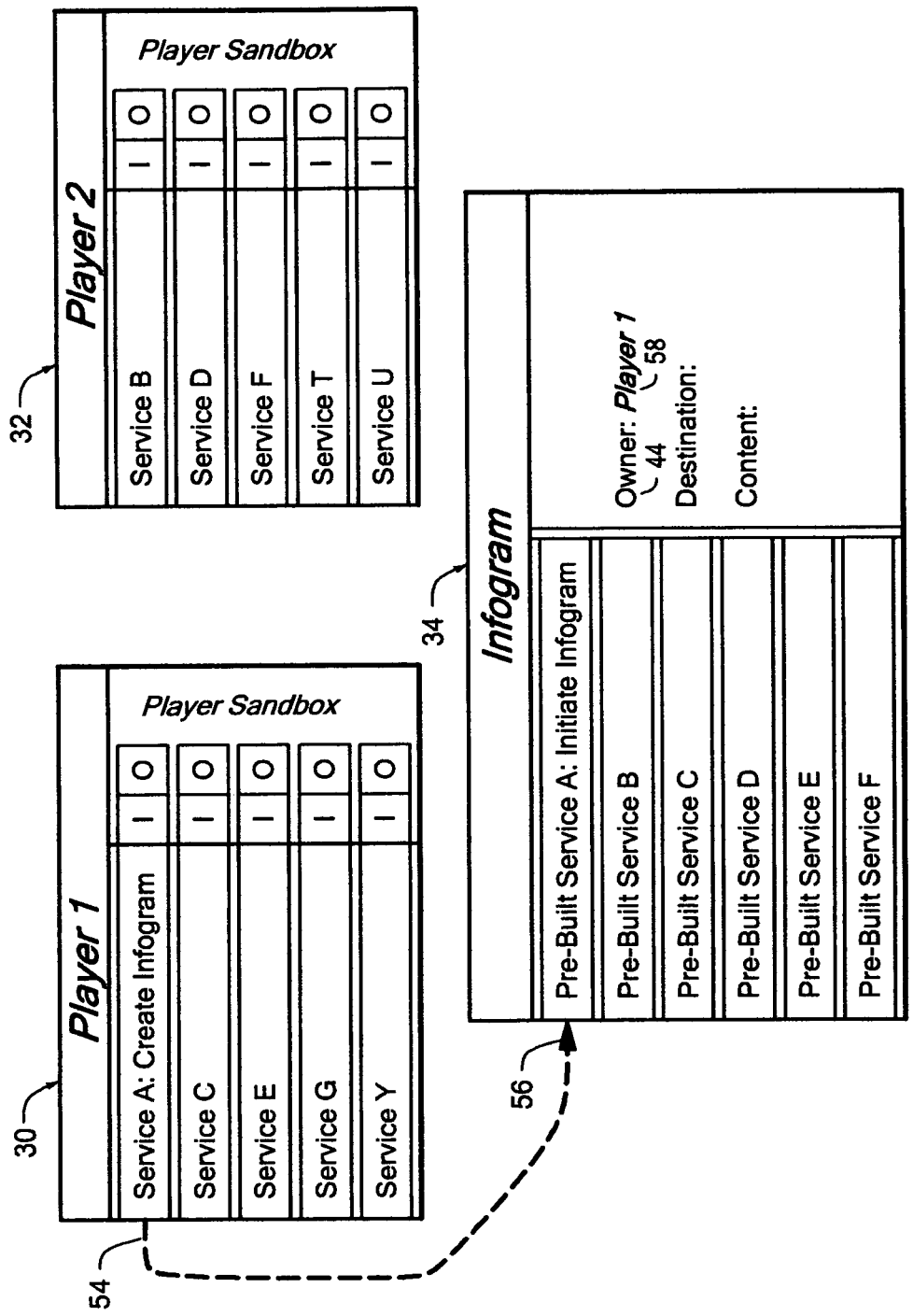
FIG. 3 illustrates creation of a reactive object by an active object in an embodiment of the disclosed system.

FIG. 3 illustrates creation of a reactive object by an active object in an embodiment of the disclosed system. As shown in FIG. 3, the active object 30 invokes a service 54 that creates a reactive object. As a result, the reactive object 56 is instantiated, and a call is made to the pre-built service 56 in the instantiated reactive object 56, which loads the owner data 44 with a link to the active object 30, shown for purposes of illustration as the value "Player 1" 58.

Figure 4:
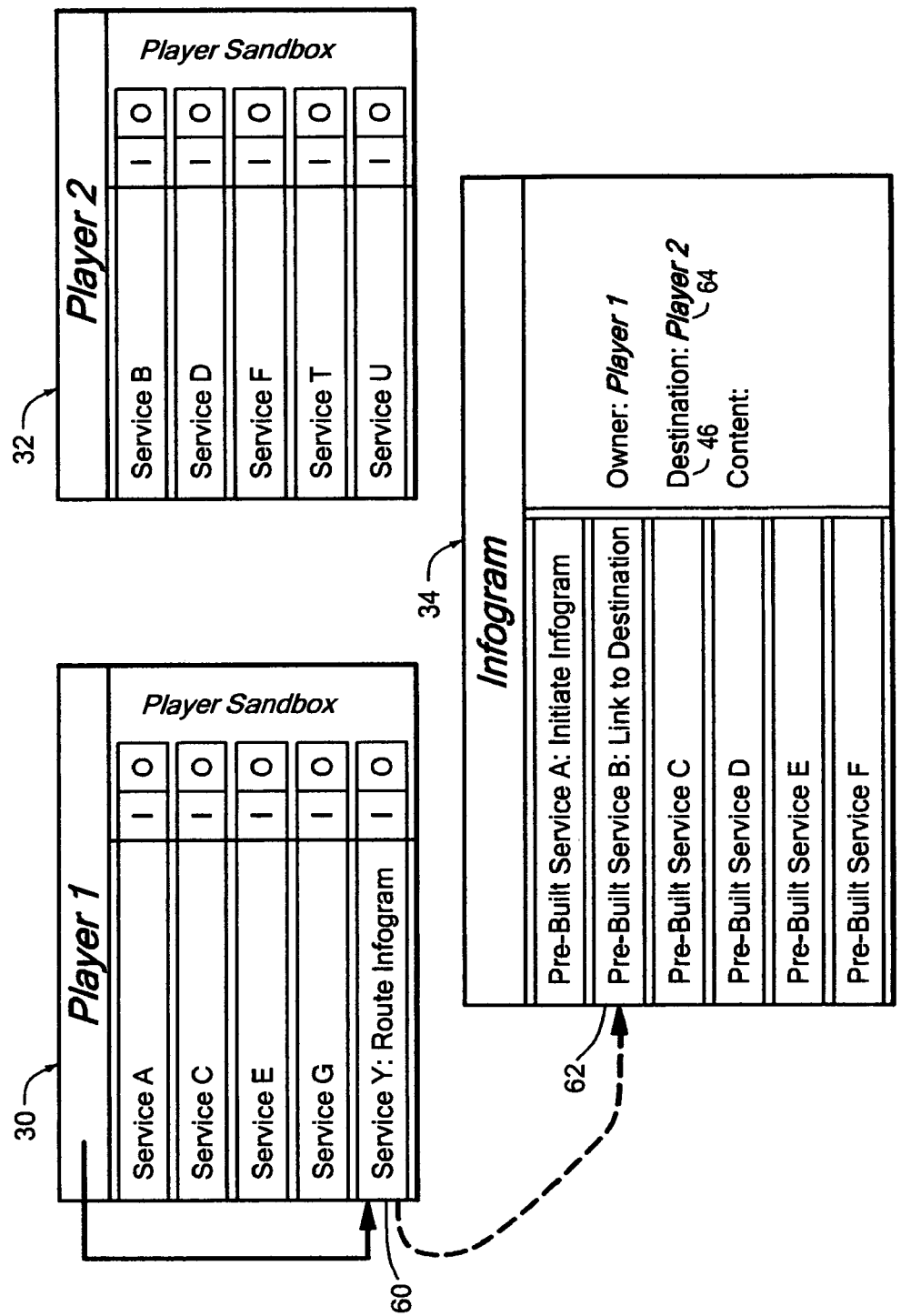
FIG. 4 illustrates routing of a reactive object by an active object to another active object in an embodiment of the disclosed system.

FIG. 4 illustrates the active object 30 causing the reactive object 34 to be routed to the active object 32. As shown in FIG. 4, the active object invokes a service 60 that causes the disclosed system to invoke a pre-built service 62 in the reactive object 34. The service 62 causes the destination data 46 in the reactive object 34 to be loaded with a link to active object 32, shown for purposes of illustration as the value "Player 2" 64.

Figure 5:
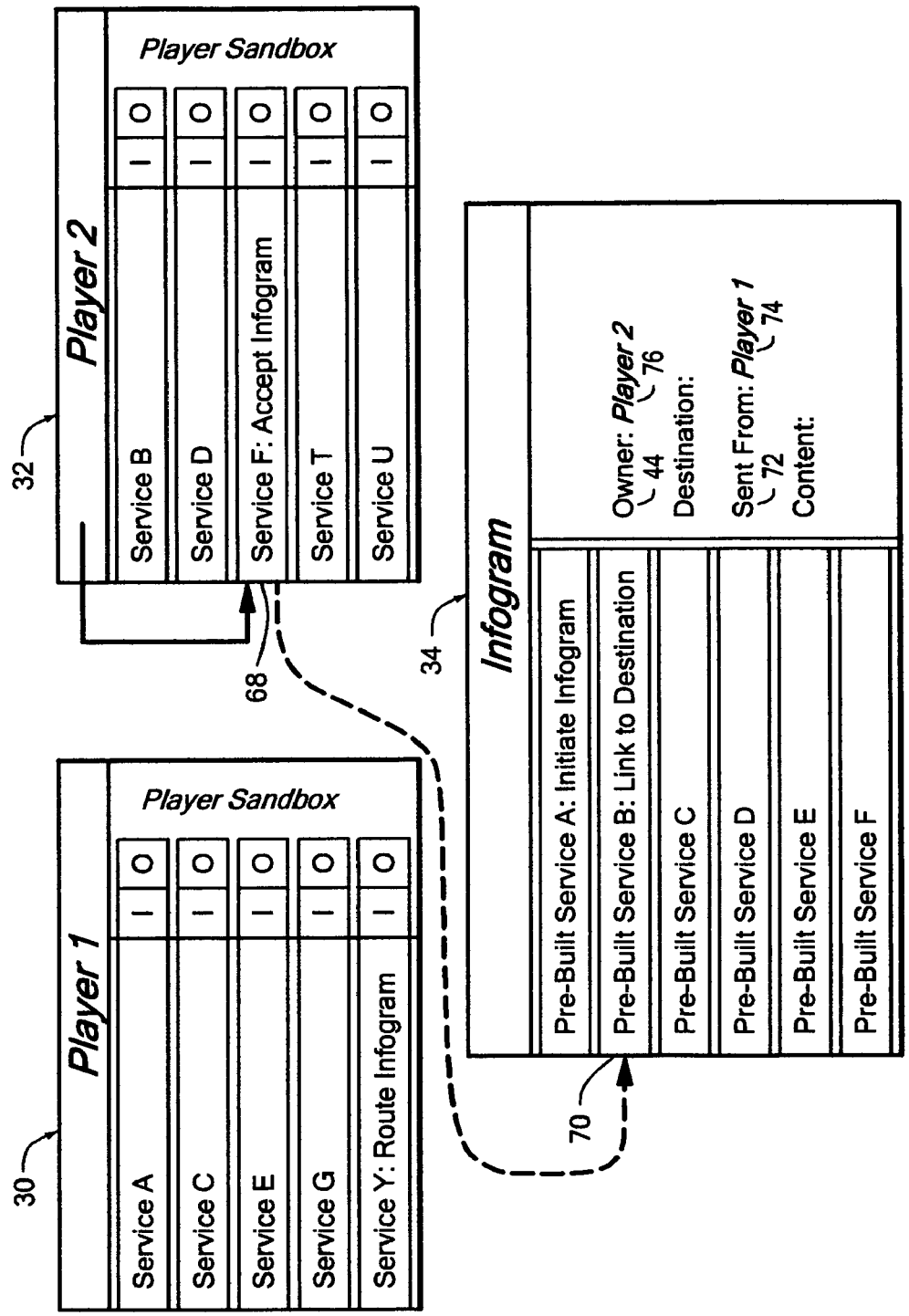
FIG. 5 illustrates transfer of ownership of a reactive object from a sending active object to a receiving active object in an embodiment of the disclosed system.

FIG. 5 illustrates transfer of ownership of the reactive object 34 from the sending active object 30 to the receiving active object 32 in an embodiment of the disclosed system. As shown in FIG. 5, the receiving active object 32 invokes a service 68 that causes the pre-built service 70 in the reactive object 34 to be invoked. The pre-built service 70 causes the ownership data 44 in the reactive object 34 to be loaded with a link to active object 32, shown for purposes of illustration as the value "Player 2" 76. A sent from data object 72 may further be used and/or caused to indicate that the active object 34 was the sender of the reactive object 34, thus preserving a link to the sending active object even after the ownership of the reactive object has been changed to indicate the receiving active object 32. Both the active objects and the reactive objects of the disclosed system are unique over space and time.

As illustrated in FIGS. 3-5, after a reactive object is instantiated, its services can be invoked only by active object services of an active object that currently owns the reactive object. In the illustrative embodiment of FIGS. 3-5, a reactive object is always owned by a single active object. The hand-off of ownership from one active object to another may occur at various specific points in the transfer of the reactive object. For example, the ownership of a reactive object may occur at any one of the following points:

1) When a sending active object determines the identity of the destination active object for the reactive object. For example, this may occur when a user clicks on "Send" when sending an email message. At such a point, the ownership of the reactive object is changed to indicate the receiving active object.

2) When the reactive object arrives at a server computer system associated with the sending active object.

3) When the reactive object arrives at a server computer system associated with the receiving active object.

4) When the reactive object arrives at a client computer system associated with the receiving active object.

5) When client software on a client computer system opens a message, such as an email message, associated with the reactive object.

In the disclosed system, routing of reactive objects between active objects is accordingly accomplished by changing ownership of the reactive objects. If the active objects involved in routing a given reactive object are all provisioned within the same computer system, such as a server system, then the routing of a reactive object may, for example, only involve passing of pointers between the active objects. No copying of the routed reactive object is required in such circumstances. In the case where a reactive object is being passed between active objects located on separate computer systems, the routed reactive object may need to be copied.

Figure 6:
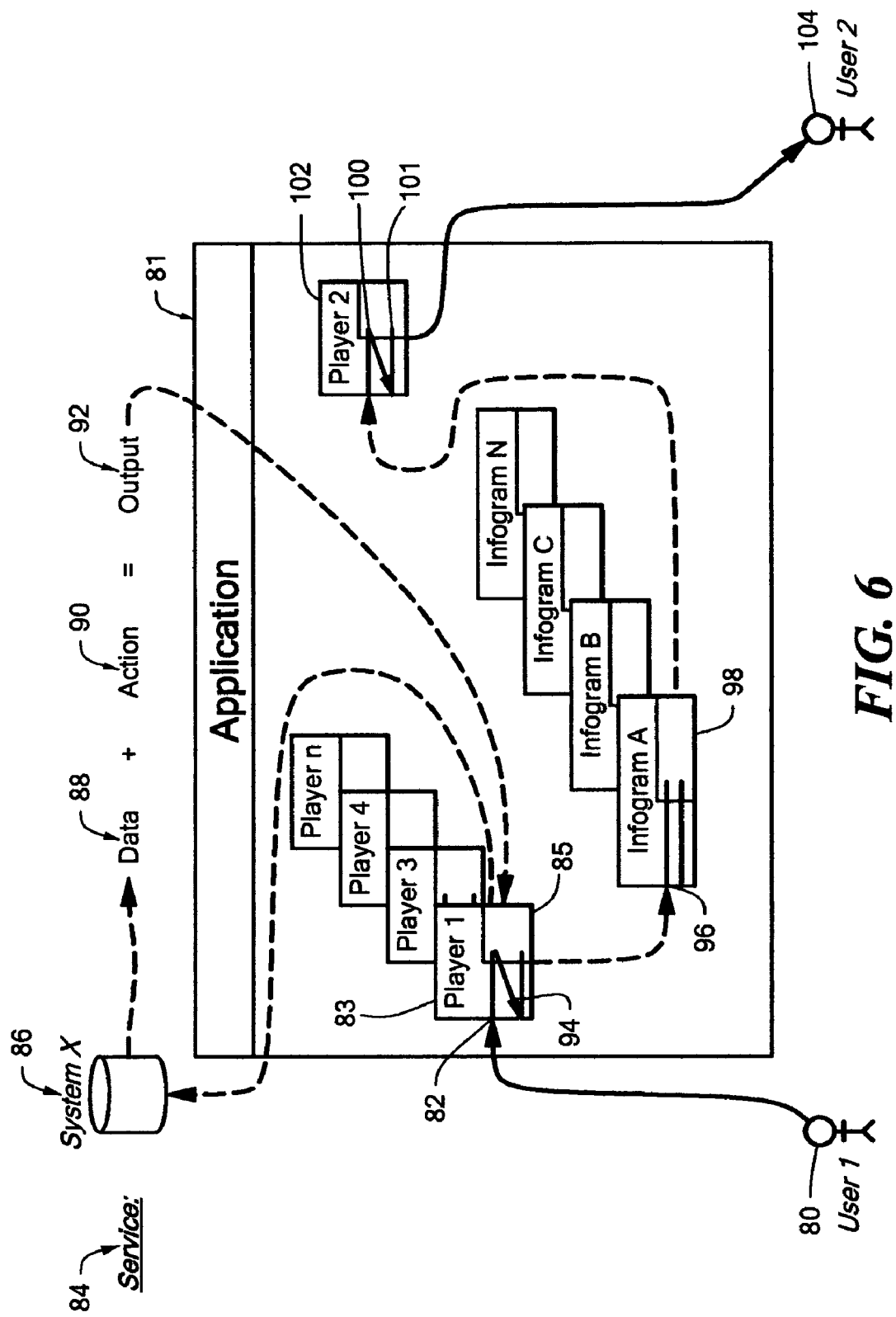
FIG. 6 illustrates operation of an embodiment of the disclosed system to invoke a service through an active object and to send a reactive object with the service results to another active object.

FIG. 6 illustrates operation of an embodiment of the disclosed system to invoke a service through an active object, and to send a reactive object with the service results to another active object. As shown in FIG. 6, a user shown as User 1 80 issues a service request that is received by the active object associated with the User 1 80, shown for purposes of illustration as Player 1 83 within the Application 81. A service function 82 is invoked as a result, causing the service 84 to be executed in response to data or functionality provided by system X 86. During execution of the service 84 on the system X 86, data 88 may, for example be provided to the private execution space 85 in the active object 83 from the system X. The action 90 is then performed on the data 88 in order to provide an output 92 that is then passed back to the 85 private execution space of the active object 83. A service 94 of the active object 83 is then invoked to create reactive object 98, which is used to pass the output 92 from the active object 83 to the active object 102. The active object then invokes a service 100 to receive the reactive object 98, and invokes another service 101 to display or otherwise present the output 92 to the receiving user, shown as User 2 104.

Figure 7:
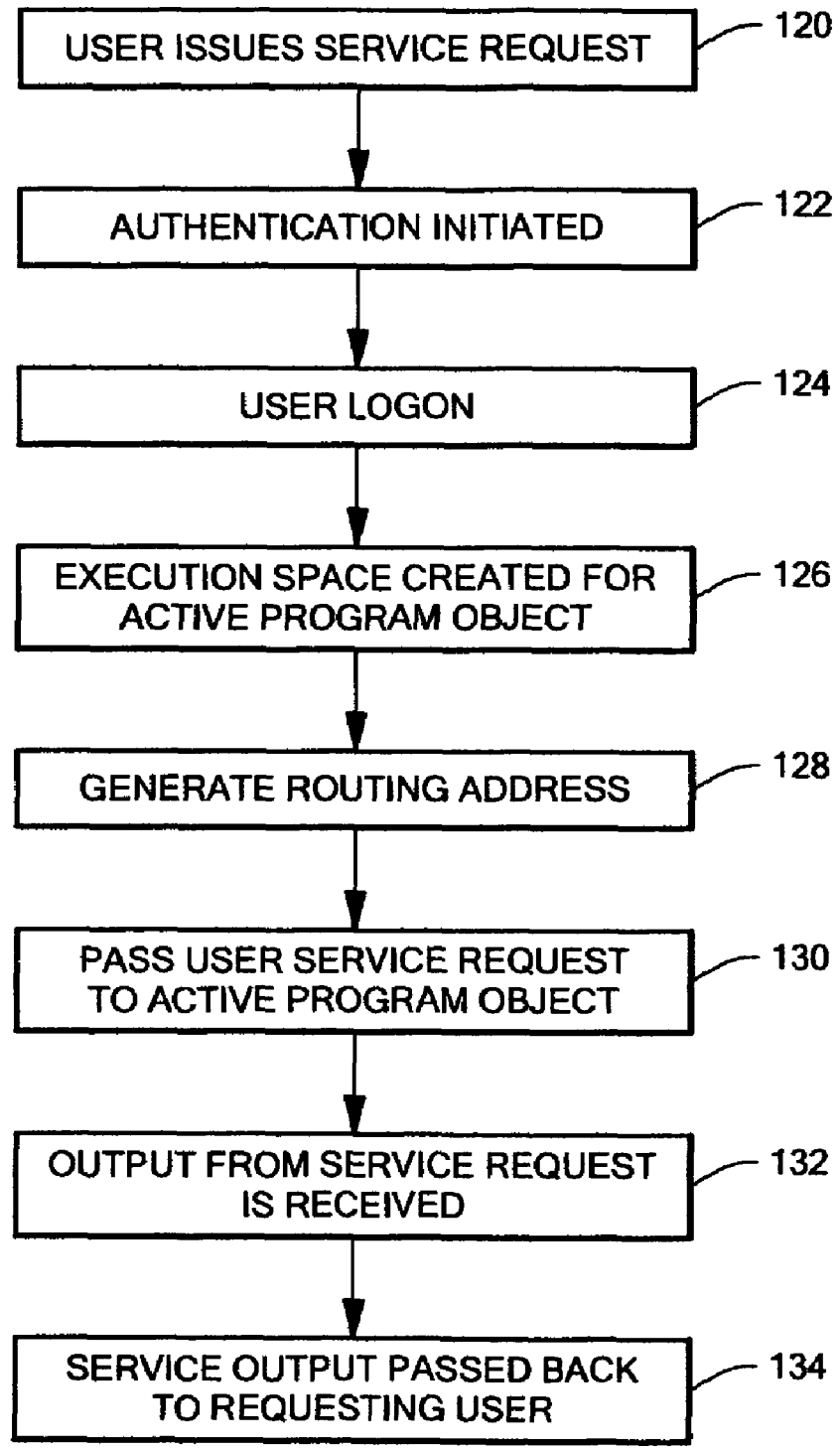
FIG. 7 is a flow chart showing steps performed in an embodiment of the disclosed system to provide a predefined service invocation chain.

FIG. 7 is a flow chart showing steps performed in an embodiment of the disclosed system to provide a predefined service invocation chain. At step 120, a user issues a service request that can be processed by an application program conformant with the disclosed application model. Since users cannot execute an application directly, at step 122, the service request is received by an underlying system engine program that supports the application program. If this is the user's first service request, the system engine initiates an authentication process to determine whether the requesting user is authorized to use the requested service. The user may then provide authentication credentials, such as a user name and password at step 124, in order to log in. In the event that the user is authenticated, the underlying system engine either instantiates an active object to be associated with the user, if this is the user's first service invocation, or re-activates the user's associated active object from a persistent storage image of the active object. No interaction with an application is possible without an identified active object, and accordingly, all further operations by the requesting user are unequivocally attributed to the active object associated with the requesting user.

At step 126, the system engine program allocates a private execution space for the requesting user's associated active object. Then, at step 128, the system engine creates a unique entry in a routing table contained in the system engine, that is associated with the active object. The routing table(s) stored in and managed by the system engine allow reactive objects to be routed by the system engine between uniquely identified active objects.

At step 130, the system engine passes the service request to the active object associated with the requesting user. At step 132, the output from the service request is received by the requesting user's active object, and at step 134 the service output is passed back to the requesting user.

All subsequent service requests by the requesting user are processed using the active object associated with that user, using the private execution space for that active object. When the user logs out, or is idle for a predetermined period and, the system engine may disconnects the user from the application, by deallocating the memory space used by the associated active object, and storing a copy of the active object in persistent (non-volatile) storage. Thus no login credentials are ever passed directly to services, so there is no opportunity to abuse them programmatically. Similarly, since service requests always result in data exchanges using reactive objects, rather than code exchanges, there is no opportunity for non-provisioned code to enter the private execution space of a user's active object. Abuse or misuse are limited in time, given the fact that longevity of executed code is always restricted to a single service invocation, and that provisioning is performed against the respective user's rights. Abuse or misuse are also limited in space, given the fact that services have no visibility beyond the address-space of the private execution space of the active object.

The disclosed application model allows predictable and consistent execution of all conformant applications, irrespective of differences between specific application services, thus allowing the underlying system-engine to assume responsibility for managing applications' system-level properties such as performance, scalability, reliability, availability, runtime security and data confidentiality. This frees application developers from the need to develop, tune and maintain the system-level properties of their applications, and allows them to focus on the developing the application-level functionality; thus, reducing required skills and decreasing the necessary level of effort to develop contemporary applications. Furthermore, consistent and predictable operation of all applications conformant with this model allows the underlying system-engine to optimize their operation and increase their quality of service.

The Figures include block diagrams and a flow chart illustration of methods, apparatus (systems) and computer program products according to an embodiment of the invention. It will be understood that each block of the Figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program object structures, one skilled in the art will recognize that the system may be embodied using a variety of specific program object structures. Accordingly, the invention should not be viewed as limited except by the scope and spirit of the appended claims.

We claim:

1. A system for providing a software program application model applied to at least one application program stored on a memory, said application program consisting of program objects of two predefined object types, said two predefined object types comprising:
   an active program object type, wherein each program object of said active program object type is associated with a single corresponding user, wherein said corresponding user is an individual person, and wherein each program object of said active program object type is uniquely operable to activate at least one associated service on behalf of its corresponding user;
   a reactive program object type, wherein each program object of said reactive program object type is owned by a single program object of said active program object type at any given time, such that each program object of said reactive program type can be modified at any given time after it is instantiated only by said program object of said active program object type that owns said program object of said reactive program object type at that given time; and
   wherein communication is provided in said system only by program objects of said active program object type sending program objects of said reactive object type to other program objects of said active program object type.

2. The system of claim 1, wherein each program object of said reactive program object type is processed by at least one program object of said active program object type.

3. The system of claim 1, wherein each program object of reactive program object type is instantiated by at least one program object of said active program object type.

4. The system of claim 1, wherein each program object of said active program object type encapsulates at least one input parameter within an execution space accessible only to said program object of said active program object type.

5. The system of claim 1, wherein each program object of said active program object type encapsulates at least one output parameter within an execution space accessible only to said program object of said active program object type.

6. The system of claim 1, further comprising:
   wherein said sending program objects of said reactive object type to other program objects of said active program object type is provided by at least one program object of said active program object type through an associated service operable to cause at least one program object of said reactive program object type to be routed to at least one other program object of said active program object type.

7. The system of claim 1, wherein at least one program object of said active program object type assumes ownership of at least one received program object of said reactive program object type upon receipt of said program object of said reactive program object type.

8. The system of claim 7, wherein said program object of said reactive program object type is determined to be received when said program object of said reactive program object type arrives at a server system associated with a user associated with a receiving program object of said active program object type.

9. The system of claim 7, wherein said program object of said reactive program object type is determined to be received when said program object of said reactive program object type arrives at a client system associated with a user associated with a receiving program object of said active program object type.

10. The system of claim 7, wherein said program object of said reactive program object type is determined to be received when said program object of said reactive program object type is selected by a user associated with a receiving program object of said active program object type.

11. The system of claim 1, wherein each of said program objects of said active program object type is persistently stored across multiple transactions and user application sessions of an associated user, and wherein each of said program objects of said active program object type stores data associated with said multiple transactions and user application sessions.

12. The system of claim 1, wherein each of said program objects of said reactive program object type is persistently linked to one of said program objects of said active program object type that owns said program object of said reactive program object type.

13. The system of claim 1, wherein each of said program objects of said reactive program object type is persistently linked to one of said program objects of said active program object type to which said program object of said reactive program object type is to be routed.

14. The system of claim 12, wherein each of said program objects of said reactive program object type is persistently stored across multiple transactions and user application sessions of an associated user for said program object of said active program object type to which said program object of said reactive program object type is linked.

15. The system of claim 1, further comprising a system engine operating to:
receive a request from a user for a service;
authenticate said request from said user for said service; and
in response to said authentication of said request for said service, activate a previously instantiated one of said program objects of said active program object type associated with said user.

16. The system of claim 1, further comprising a system engine operating to:
receive a request from a user for a service;
authenticate said request from said user for said service; and
in response to said authentication of said request for said service, instantiate a new one of said program objects of said active program object type associated with said user.

17. The system of claim 1, further comprising a system engine operating to:
receive a request from a user for a service;
authenticate said request from said user for said service; and
in response to said authentication of said request for said service, create an entry in a routing table, wherein said entry indicates a current location of one or said program objects of said active program object type associated with said user.

18. The system of claim 1, further comprising a system engine operating to:
receive a request from a user for a service;
authenticate said request from said user for said service; and
in response to said authentication of said request for said service, create a private execution space for a program object of said active program object type associated with said user.

19. The system of claim 18, wherein said program object of said active program object type associated with said user uses said private execution space for executing said service in said request for service.

20. The system of claim 19, wherein said program object of said active program object type associated with said user uses said private execution space for executing a service associated with a subsequent request for service from said user.

21. A system for providing at least one conformant software application stored on a memory, comprising:
means for providing a plurality of program objects of an active program object type, wherein each of said plurality of program objects of said active program object type is associated with a single corresponding user, wherein said corresponding user is an individual person, and wherein each program object of said active program object type uniquely operates to activate at least one associated service on behalf of its corresponding user;
means for providing a plurality of program objects of a reactive program object type, wherein each of said plurality of program objects of said reactive program object type is owned by a single one of said program objects of said active program object type at any given time, such that each program object of said reactive program type can be modified at any given time after it is instantiated only by said program object of said active program object type that owns said program object of said reactive program object type at that given time;
wherein communication is provided only by said program objects of said active program object type sending program objects of said reactive object type to other program objects of said active program object type; and
wherein said at least one conformant software application consists of said plurality of program objects of said active program object type and said plurality of program objects of said reactive program object type.

22. A method for providing at least one conformant application program stored on a memory, comprising:
providing a plurality of program objects of an active program object type, wherein each of said program objects of said active program object type is associated with a single corresponding user, wherein said corresponding user is an individual person, and wherein each program object of said active program object type uniquely operates to activate at least one associated service on behalf of its corresponding user;
providing a plurality of program objects of a reactive program object type, wherein each program object of said reactive program object type is owned by a single one of said program objects of said active program object type at any given time, such that each program object of said reactive program type can be modified at any given time after it is instantiated only by said program object of said active program object type that owns said program object of said reactive program object type at that given time;

wherein communication is provided only by said program objects of said active program object type sending program objects of said reactive object type to other program objects of said active program object type; and wherein said at least one conformant application program consists of said plurality of program objects of said active program object type and said plurality of program objects of said reactive program object type.

23. A computer program product including a computer readable storage medium, said computer readable storage medium having program code for providing at least one conformant application program stored thereon, said program code comprising:

program code for providing a plurality of program objects of an active program object type, wherein each of said plurality of program objects of said active program object type is associated with a single corresponding user, wherein said corresponding user is an individual person, and wherein each program object of said active program object type uniquely operates to activate at least one associated service on behalf of its corresponding user;

program code for providing a plurality of program objects of a reactive program object type, wherein each of said plurality of said program objects of said reactive program object type is owned by a single one of said program objects of said active program object type at any given time, such that each program object of said reactive program type can be modified at any given time after it is instantiated only by said program object of said active program object type that owns said program object of said reactive program object type at that given time; and wherein communication is provided only by said program objects of said active program object type sending program objects of said reactive object type to other program objects of said active program object type; and wherein said at least one conformant application program consists of said plurality of program objects of said active program object type and said plurality of program objects of said reactive program object type.

\* \* \* \* \*